UNITED STATES PATENT OFFICE.

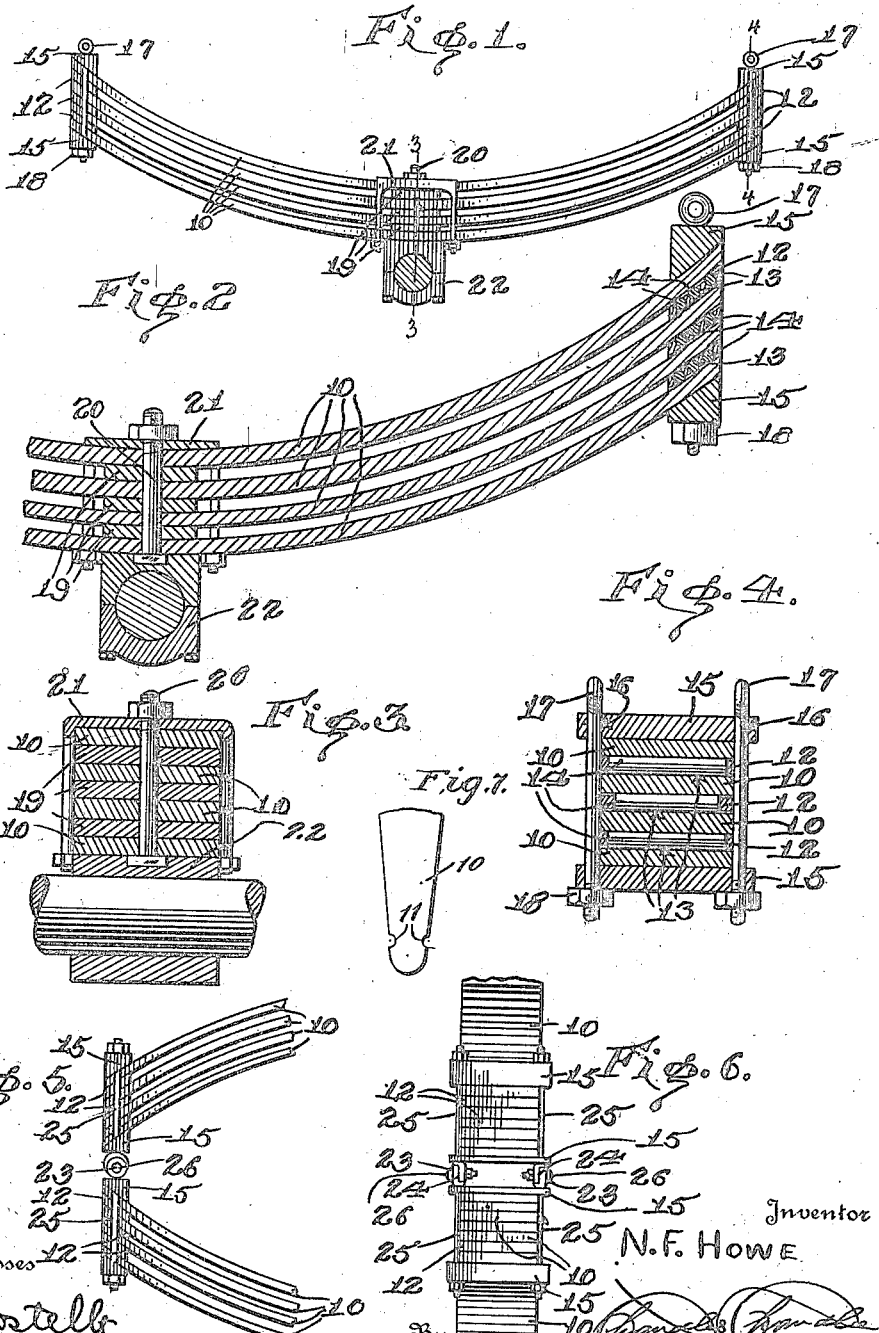

NICHOLAS F. HOWE, OF ROUND MOUNTAIN, NEVADA.

VEHICLE-SPRING.

1,215,156. Specification of Letters Patent. Patented Feb. 6, 1917.

Application filed July 28, 1915. Serial No. 42,412.

*To all whom it may concern:*

Be it known that I, NICHOLAS F. HOWE, a citizen of the United States, residing at Round Mountain, in the county of Nye, State of Nevada, have invented certain new and useful Improvements in Vehicle-Springs; and I do hereby declare the following to be a full, clear, and exact description of the invention, such as will enable others skilled in the art to which it appertains to make and use the same.

This invention relates to improvements in vehicle springs and particularly to springs for use on automobiles.

One object of the invention is to provide a vehicle spring which will contain a greater amount of resiliency than the ordinary laminated springs but which will retain its resiliency longer than the ordinary springs.

Another object is to provide a vehicle spring wherein the friction of the laminated parts of the spring is eliminated.

Other objects and advantages will be apparent from the following description when taken in connection with the accompanying drawing.

In the drawing:

Figure 1 is an elevation of a spring made in accordance with my invention,

Fig. 2 is a vertical longitudinal sectional view through the spring,

Fig. 3 is a vertical section on the line 3—3 of Fig. 1,

Fig. 4 is a vertical section on the line 4—4 of Fig. 1,

Fig. 5 is an elevation of one end of a double spring made in accordance with my invention, and Fig. 6 is an end view of the same.

Fig. 7 is a plan view of one end of one of the springs.

Referring particularly to the accompanying drawing, 10 represents a plurality of superposed strips of spring steel which taper from the center toward the opposite ends. On each side of each end of each of the strips 10 is formed a notch 11, the notches of all of the strips registering at the ends of the spring when they are in proper position. Disposed between the ends of each pair of springs is a spacing block 12 in which is formed a plurality of elongated parallel slots 13, and within these slots and bearing against the adjacent faces of the spring ends are rollers 14.

Disposed on top of the end of the uppermost frame and against the bottom face of the lowermost spring are the wedge blocks 15, the same being provided adjacent their side edges with vertical openings 16 through which are disposed the vertical bolts 17, nuts 18 being engaged on the lower end of said bolts, to clamp the springs and blocks firmly together.

In the section, Fig. 4, it will be noted that the bolts engage in the notches 11 of the spring ends, thus holding the strips from longitudinal movement with respect to each other. Between the intermediate portions of the strips are disposed the spacing blocks 19 through the centers of which, and through the centers of the strips is disposed a clamping bolt 20. A suitable clip 21 embraces the intermediate portion of the spring and is provided with a bearing member 22 for attachment to the axle of a vehicle.

The parts just described have reference to a single spring, but upon reference to Figs. 5 and 6 there is shown the application of the invention to a double spring. In this latter case, the main difference is in the formation of the bolts 17. These bolts are provided with the eyes 23 on their upper ends which are cut away as at 24 so as to interlock with the bolts 25 of the upper portion of the spring, smaller bolts 26 being passed through the alined eyes to hold the bolts together.

What is claimed is:

A vehicle spring comprising a plurality of superimposed metal strips, the ends of which are provided with oppositely disposed notches, slotted spacing blocks between the ends of the strips, means for clamping the blocks and strips together, and rotatable elements within the slots of the blocks and bearing against the mutually adjacent faces of the strips.

In testimony whereof, I affix my signature, in the presence of two witnesses.

NICHOLAS F. HOWE.

Witnesses:
THOMAS NELSON,
A. BILTOFT.